United States Patent
Huang et al.

(10) Patent No.: US 8,155,455 B2
(45) Date of Patent: Apr. 10, 2012

(54) IMAGE CAPTURING SYSTEM AND METHOD THEREOF

(75) Inventors: Yu-Wen Huang, Taipei (TW); Chih-Hui Kuo, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1030 days.

(21) Appl. No.: 12/045,665

(22) Filed: Mar. 10, 2008

(65) Prior Publication Data

US 2009/0226102 A1 Sep. 10, 2009

(51) Int. Cl.
*G06K 9/36* (2006.01)

(52) U.S. Cl. ...................................................... 382/232

(58) Field of Classification Search .......... 382/232–251; 375/240.01–240.29; 386/212, 109, 111, 386/124–125, 112, 52
See application file for complete search history.

(56) References Cited

U.S. PATENT DOCUMENTS

| | | | |
|---|---|---|---|
| 6,233,359 B1 * | 5/2001 | Ratnakar et al. ............. 382/250 |
| 7,224,891 B1 | 5/2007 | Jam | |
| 7,254,272 B2 | 8/2007 | Mitchell | |
| 7,260,264 B2 * | 8/2007 | Guillou et al. ................ 382/232 |
| 7,403,662 B2 * | 7/2008 | Mitchell et al. ............... 382/233 |
| 7,668,441 B2 * | 2/2010 | Kim ............................. 386/212 |
| 2003/0108206 A1 | 6/2003 | Diehl | |
| 2003/0123857 A1 | 7/2003 | Egawa | |
| 2003/0169814 A1 | 9/2003 | Fu | |
| 2004/0223650 A1 | 11/2004 | Guillou | |
| 2005/0041958 A1 | 2/2005 | Kim | |

FOREIGN PATENT DOCUMENTS

| | | |
|---|---|---|
| CN | 1585472 A | 2/2005 |
| CN | 1809162 A | 7/2006 |

* cited by examiner

*Primary Examiner* — Ishrat I Sherali

(74) *Attorney, Agent, or Firm* — Winston Hsu; Scott Margo

(57) ABSTRACT

An image capturing system comprises a storage device and a transcoder module coupled to the storage device. The storage device stores image data of a captured still image compressed by a first coding format configured. The transcoder module transcodes the image data compressed by the first coding format into output image data compressed by a second coding format and outputting the output image data to an external device when the external device requests the captured still image.

11 Claims, 2 Drawing Sheets

IMAGE CAPTURING SYSTEM AND METHOD THEREOF

BACKGROUND OF THE INVENTION

The present invention relates to an image capturing system, and more particularly, to an image capturing system with transcoding function, and a related method thereof.

Compression is an image processing technology for reducing a file size without significant degradation of the visual quality. There are various types of image compression standards such as JPEG (Joint Photographic Experts Group), JBIG (Joint Bilevel Image Group), GIF (Graphics Interchange Format) etc. Of these standards, JPEG is the most popular still image compression standard at the moment.

However, better image compression performance (smaller file size and less degradation of the visual quality) is always demanded for storing more compressed files in a storage device such as an SD card.

SUMMARY OF THE INVENTION

One of the objectives of the present invention is to provide an image capturing system capable of transcoding image data compressed by a first coding format into output image data compressed by a second coding format, and a related method thereof.

According to an exemplary embodiment of the invention, an image capturing system comprises a storage device utilized for storing image data of a captured still image in a first coding format; and a transcoder module coupled to the storage device and utilized for transcoding the image data corresponding to the first coding format into output image data corresponding to a second coding format and outputting the output image data to an external device when the captured still image is requested by the external device.

According to an exemplary embodiment of the claimed invention, an image capturing method comprises: storing image data of a captured still image in a first coding format; and transcoding the image data corresponding to the first coding format into output image data corresponding to a second coding format and outputting the output image data when the captured still image is requested.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
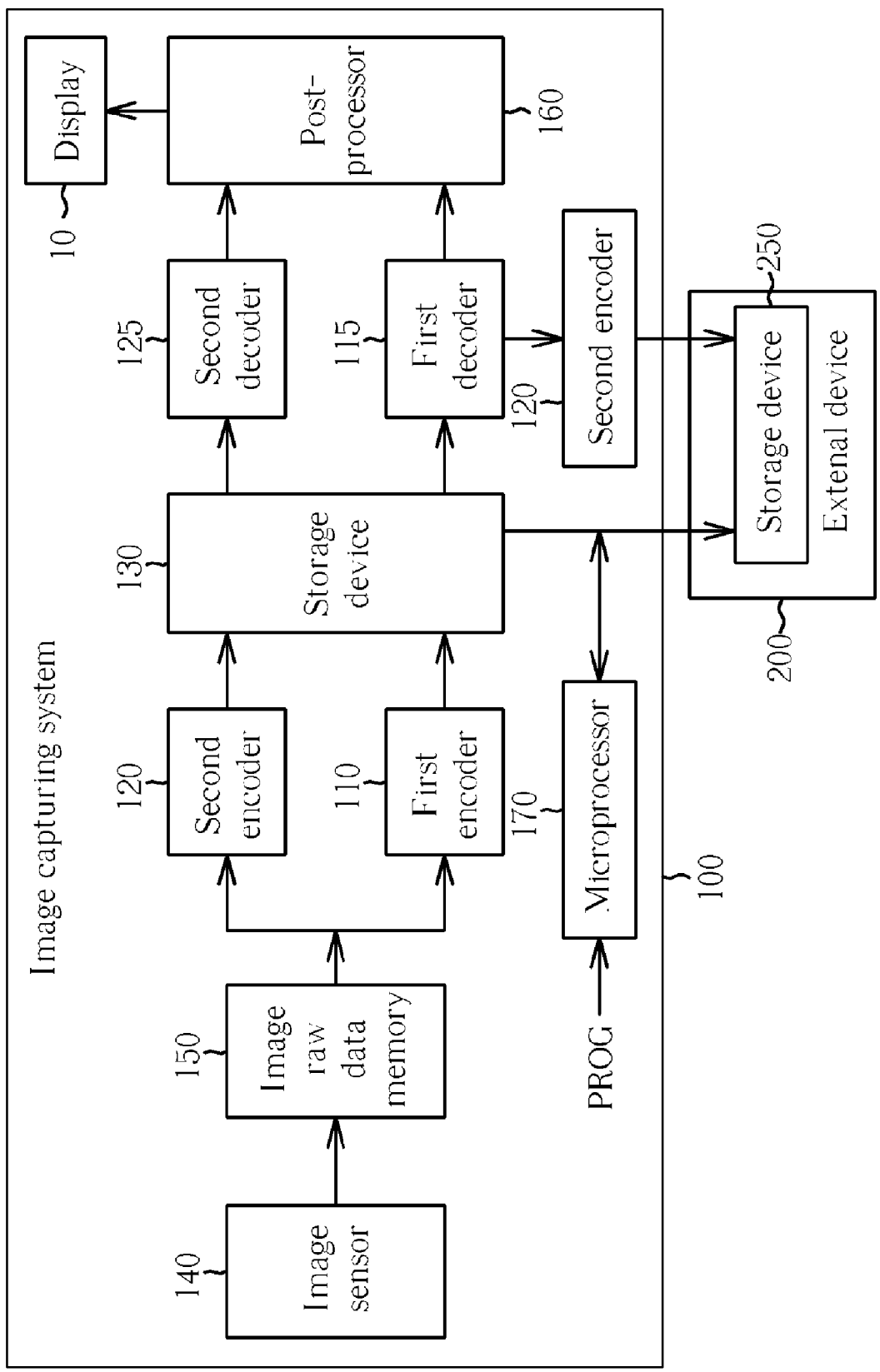
FIG. 1 is a block diagram illustrating an image capturing system according to a first embodiment of the present invention.

Please refer to FIG. 1. FIG. 1 is a block diagram illustrating an image capturing system 100 according to the first embodiment of the present invention. As shown in FIG. 1, the image capturing system 100 comprises a first encoder 110, a second encoder 120, a storage device 130, a first decoder 115 and a second decoder 125. In this embodiment, the image capturing system 100 is integrated in a digital still camera (DSC); however, this is merely one embodiment of the present invention. In practice, the image capturing system 100 can be integrated in a DSC cellular phone or any DSC apparatus. The image capturing system 100 further comprises an image sensor 140, an image raw data memory 150 and a post-processor 160. When the image capturing system 100 captures a still image, the image sensor 140 records the intensity or brightness of the light that falls on each photosite contained in the image sensor 140 to generate image raw data. The image raw data memory 150 stores image raw data generated from the image sensor 140. The first encoder 110 and the second encoder 120 are both coupled to the image raw data memory 150 and the storage device 130. The first encoder 110 encodes image raw data stored in the image raw data memory 150 into image data corresponding to a first coding format and storing the encoded image data into the storage device 130. Similarly, the second encoder 120 encodes image raw data stored in the image raw data memory 150 into image data corresponding to a second coding format and storing the encoded image data into the storage device 130. The storage device 130, such as an SD card, stores the image data encoded by the first encoder 110 and the second encoder 120. The first decoder 115 and the second decoder 125 are both coupled to the storage device 130. The first decoder 115 decodes the image data corresponding to the first coding format into decoded image data. Similarly, the second decoder 125 decodes the image data corresponding to the second coding format into decoded image data. The post-processor 160 performs scaling or noise elimination on the decoded image data received from the first decoder 115 or the second decoder 125.

In addition, the first decoder 115 is further coupled to the second encoder 120, and the second encoder 120 encodes the decoded image data received from the first decoder 115 into output image data corresponding to the second coding format. Therefore, in this exemplary embodiment, a transcoder module 102 is composed of the first decoder 115 and the second encoder 120 for transcoding the image data compressed by the first coding format into the output image data compressed by the second coding format.

Further description of the operation of the image capturing system 100 is detailed below. In the following description, the first coding format complies with a H.264 standard and the second coding format complies with a JPEG standard; however, it should be noted that this is merely for illustrative purpose, and is not meant to be a limitation of the present invention. In practice, the first format can comply with any video compression standard, such as MPEG-1 standard, MPEG-2 standard, MPEG-4 standard, H.261 standard or H.263 standard, and the second format can comply with any still image compression standard, such as JPEG-2000 standard.

Please refer to FIG. 1 again. Still image raw data are encoded into JPEG image data for storage and transmission since the JPEG standard is popular for still image coding. The image raw data generated from the image sensor 140 and stored in the image raw data memory 150 are encoded by the second encoder 120 (e.g. JPEG encoder) into image data complying with the second coding format (e.g. JPEG), and then the image data are stored into the storage device 130 (SD card). When it is required to play the captured image directly on the display 10 of the DSC, the second decoder 125 (e.g. JPEG decoder) decodes the image data in JPEG coding format into decoded image data. Next, the post-processor 160 processes the decoded image data so as to allow the decoded image data corresponding to the captured image to be displayed on the display 10 of the DSC. When an external device 200 (e.g. a personal computer) requests the captured image from the DSC, image data in JPEG coding format are retrieved from the storage device 130 (SD card) and stored in a storage device 250 of the external device 200.

The above description illustrates typical operations of a image capturing system 100 when processing image raw data of captured still images. In this embodiment, the first encoder 110 (H.264 encoder) and the first decoder 115 (H.264 decoder), generally used for encoding and decoding video data, are used to process still images due to its better compression performance compared to image coding standards such as JPEG. As a result, the image raw data generated from the image sensor 140 and stored in the image raw data memory 150 can be encoded by the first encoder 110 (H.264 encoder) into image data in the first coding format (H.264), and then the image data are stored into the storage device 130 (SD card). A benefit of encoding the captured images in the first coding format (e.g. H.264) rather than the second coding format (e.g. JPEG) is to reduce the size of encoded pictures, so the storage device (e.g. SD card) can save more pictures. However, in some other embodiments, compression performance of the first coding format is no better than the second coding format. Coding the captured image into that particular first coding format may because of its easy computation for coding, faster compression speed, or less power consumption. Please note that the first coding format is not necessary to be coding format for video coding and the second coding format is not necessary to be coding format for image coding, for example, both first and second coding format can be video coding format, both can be image coding format, or the first coding format is for video coding and the second coding format is for image coding.

When it is required to play a captured image directly on the display 10 of the DSC, the first decoder 115 (e.g. H.264 decoder) decodes the image data (e.g. H.264 image data) into decoded image data. Next, the post-processor 160 processes the decoded image data to improve quality of the display image or modify the display image. Some post-processing examples conducted after decoding are noise reduction, brightness, contrast, sharpness adjusting, compensating for night scenes, making image black and white, and changing or overlaying colors.

However, when image data (H.264 image data) stored in the storage device 130 (SD card) are transmitted to the storage device 250 of the external device 200, the image data (H.264 image data) are converted to output image data corresponding to the second coding format (JPEG standard) through the transcoder module 102. In this embodiment, the first decoder 115 (H.264 decoder) decodes the image data into decoded image data. Next, the second encoder 120 (JPEG encoder) encodes the decoded image data into the output image data corresponding to the second coding format (JPEG standard) and output the output image data to the storage device 250 of the external device 200. In another embodiment, the image data encoded in the first coding format (e.g. H.264) can be accessed by an external device without a transcoder module. For example, the user wishes to temporally save the captured images in a portable memory device, by storing captured images in the H.264 format into the portable memory device, the required memory space of the portable memory device is less than for storing images in the JPEG format. In another example, if the external device is capable of playing the first coding format (e.g. H.264), the image data can be transmitted to the external device without transcoding to the second coding format (e.g. JPEG).

In this embodiment, the image data are transmitted from the storage device 130 (SD card) of the image capturing system 100 (DSC) to the storage device 250 of the external device 200 (PC) via a USB 2.0 transmission line. However, this is only for illustrative purposes, and should not be taken as a limitation of the present invention. For example, the image data are transmitted via a Bluetooth interface. In another embodiment, the image capturing system 100 can be a cellular phone and the external device 200 can be another cellular phone. The image data can be transmitted from the storage device 130 (SD card) of the cellular phone to another cellular phone's SD card via wireless communication networks such as WLAN, WIMAX, WIFI, 3G.

Briefly summarized, since some video coding formats such as the H.264 standard have a better compression performance than the still image coding formats such as the JPEG standard, encoding the image raw data according to the H.264 standard enables the SD card to save more photos than in JPEG standard.

The image capturing system 100 further comprises a microprocessor 170. In some embodiments, when a user wishes to preview the list of image files stored in the image capturing system 100 through an external device 200 (e.g. a personal computer), the microprocessor 170 executes a program execution code PROG to retrieve a file name of the image data, convert the retrieved file name having a file extension corresponding to the first coding format into an output file name having a file extension corresponding to the second coding format. Storing image data in the image capturing system 100 with the first coding format (e.g. H.264) is therefore transparent to the user of the external device. Likewise, when a file size of a captured image or a total file size of images stored in the image capturing system 100 is requested by the external device 200, the microprocessor 170 executes the program execution code to retrieve the corresponding file size of the image data imaged with the first coding format, convert the retrieved file size corresponding to the first coding format into an output file size corresponding to the second coding format. The output file size is only an estimate, which provides the user a rough idea of how large the photo is in the second coding format (e.g. JPEG). Again, this is to make encoding the image data into the first coding format transparent to the user.

For example, H.264 image data with a file name and file size of "abc.avi" and 3 Mb respectively, are requested by a personal computer, the microprocessor 170 executes the program execution code PROG to convert the file name "abc.avi" into "abc.jpg". Also, the microprocessor 170 executes the program execution code PROG to convert the file size by multiplying with a value. Said value can be determined according to a preset conversion relation between the first coding format and second coding format. For example, it is assumed that the file size of an image encoded with H.264 is about half the file size of the image encoded with JPEG, the value is chosen to be 2. The converted file size is accordingly converted from 3 Mb to 6 Mb. This is only an example, however, and the value can be chosen to be 2.5 or 3 depending on the compression ratio between the first and second coding formats. Consequently, the file name displayed on the personal computer is "abc.jpg", and the file size is 6 Mb. In this way, the user is not aware of the fact that the image data are actually stored in the storage device 130 in H.264 standard.

In addition, in this embodiment the file size is converted by multiplying it with a value; however, any calculation that can achieve the same objective of converting the retrieved file size corresponding to the first format into the output file size corresponding to the second format is workable. File size conversion can be simply accomplished by searching a table with one or more image information such as photo resolution and size setting, so photos taken under the same resolution and size setting are converted to the same file size.

Figure 2:
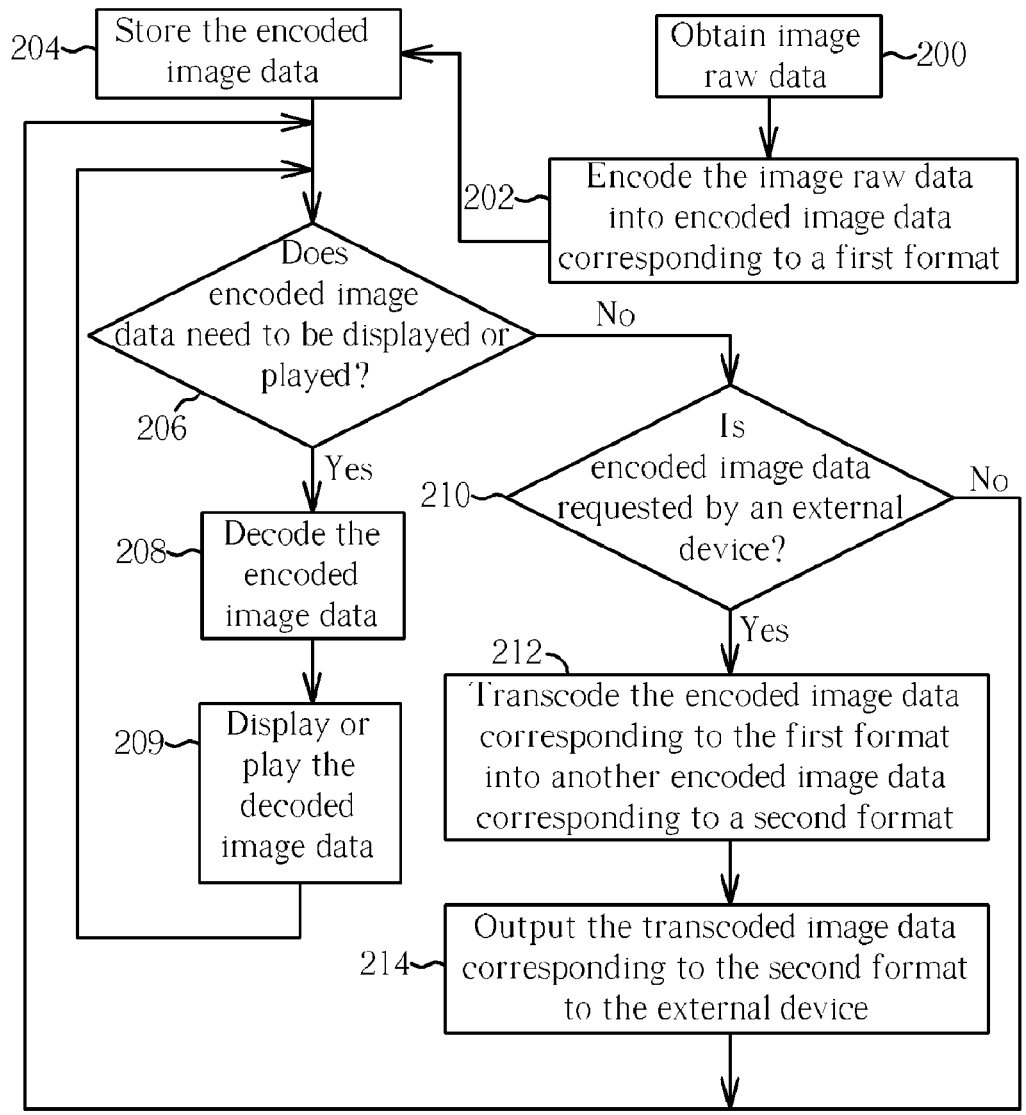
FIG. 2 is a flowchart illustrating an image capturing method according to an embodiment of the present invention.

FIG. 2 is a flowchart illustrating an image capturing method according to an embodiment of the present invention. Provided that the result is substantially the same, the steps are not limited to be executed in the exact order shown in FIG. 2. The exemplary image capturing method can be employed by the image capturing system 100 shown in FIG. 1, and is summarized as below.

Step 200: Use image sensor in a DSC to obtain image raw data corresponding to a still image captured by the DSC.
Step 202: Encode the image raw data into encoded image data corresponding to a first coding format complying with a video compression standard, such as MPEG-1 standard, MPEG-2 standard, MPEG-4 standard, H.261 standard or H.263 standard.
Step 204: Store the encoded image data into a storage device of the DSC.
Step 206: Are encoded image data displaying on the DSC? If yes, go to step 208; otherwise, go to step 210.
Step 208: Generate decoded image data by decoding the encoded image data.
Step 209: Display the decoded image data on the DSC. The flow can return back to step 206.
Step 210: Are encoded image data requested by an external device? If yes, go to step 212; otherwise, go to step 216.
Step 212: Transcode the encoded image data corresponding to the first coding format into image data corresponding to a second coding format complying with a still image compression standard, such as JPEG-2000 standard.
Step 214: Output the transcoded image data corresponding to the second coding format to the external device.

As a skilled person can readily understand operation of each step in FIG. 2 after reading the aforementioned disclosure, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capturing system connected to a storage device which is used for storing image data of a captured still image compressed by a first coding format, the image capturing system comprising:
    a first encoder for encoding image raw data of the captured still image into the image data compressed by the first coding format and transmitting the image data compressed by the first coding format to the storage device; and
    a transcoder module comprising:
        a first decoder for decoding the image data compressed by the first coding format from the storage device and generating decoded image data; and
        a second encoder, coupled to the first decoder, for encoding the decoded image data into output image data compressed by a second coding format, wherein the first coding format has better compression performance than the second coding format.

2. The image capturing system of claim 1, wherein the first coding format complies with a video compression standard and the second coding format complies with an image compression standard.

3. The image capturing system of claim 2, wherein the first coding format complies with MPEG-1 standard, MPEG-2 standard, MPEG-4 standard, H.261 standard, H.263 standard or H.264 standard, and the second coding format complies with JPEG standard or JPEG-2000 standard.

4. The image capturing system of claim 1, further comprising:
    a microprocessor, executing program execution codes to retrieve a file name of the captured still image, converting the retrieved file name having a file extension corresponding to the first coding format into an output file name having a file extension corresponding to the second coding format.

5. The image capturing system of claim 1, further comprising:
    a microprocessor, executing program execution codes to retrieve a file size of the captured still image, converting the retrieved file size corresponding to the first coding format into an output file size corresponding to the second coding format.

6. An image capturing method, comprising:
    storing image data of a captured still image compressed by a first coding format into a storage device;
    decoding the image data compressed by the first coding format from the storage device and generating decoded image data;
    encoding the decoded image data into output image data compressed by a second coding format; and
    outputting the output image data;
    wherein the first coding format has better compression performance than the second coding format.

7. The image capturing method of claim 6, further comprising:
    encoding image raw data into the image data compressed by the first coding format and storing the image data into the storage device.

8. The image capturing method of claim 6, further comprising:
    retrieving a file name of the captured still image, converting the retrieved file name having a file extension corresponding to the first coding format into an output file name having a file extension corresponding to the second coding format.

9. The image capturing method of claim 6, further comprising:
    retrieving a file size of the captured still image data, converting the retrieved file size corresponding to the first coding format into an output file size corresponding to the second coding format.

10. The image capturing method of claim 6, wherein the first coding format complies with a video compression standard and the second coding format complies with an image compression standard.

11. The image capturing method of claim 10, wherein the first coding format complies with MPEG-1 standard, MPEG-2 standard, MPEG-4 standard, H.261 standard, H.263 standard or H.264 standard, and the second coding format complies with JPEG standard or JPEG-2000 standard.

* * * * *